United States Patent
Zhang et al.

(10) Patent No.: US 12,034,820 B2
(45) Date of Patent: Jul. 9, 2024

(54) FUSING AND DEGRADATION METHOD AND APPARATUS FOR MICRO-SERVICE, DEVICE, AND MEDIUM

(71) Applicant: Beijing Baidu Netcom Science Technology Co., Ltd., Beijing (CN)

(72) Inventors: Jia Zhang, Beijing (CN); Qiyuan Li, Beijing (CN); Tao Liu, Beijing (CN); Yi Zhang, Beijing (CN)

(73) Assignee: Beijing Baidu Netcom Science Technology Co., Ltd., Beijing (CN)

( * ) Notice: Subject to any disclaimer, the term of this patent is extended or adjusted under 35 U.S.C. 154(b) by 78 days.

(21) Appl. No.: 17/676,056

(22) Filed: Feb. 18, 2022

(65) Prior Publication Data

US 2022/0174122 A1    Jun. 2, 2022

(30) Foreign Application Priority Data

Mar. 5, 2021    (CN) .......................... 202110245817.5

(51) Int. Cl.
*H04L 41/042*    (2022.01)
*G06F 11/07*    (2006.01)
(Continued)

(52) U.S. Cl.
CPC ............ *H04L 67/51* (2022.05); *G06F 11/076* (2013.01); *H04L 43/12* (2013.01)

(58) Field of Classification Search
CPC ......... H04L 67/51; H04L 43/12; H04L 41/16; H04L 43/0823; H04L 41/046;
(Continued)

(56) References Cited

U.S. PATENT DOCUMENTS

| 10,684,940 | B1* | 6/2020 | Kayal ................. G06F 11/3664 |
| 10,951,485 | B1* | 3/2021 | Hermoni ............. H04L 41/0604 |
| 2018/0034832 | A1* | 2/2018 | Ahuja ..................... H04L 67/51 |

(Continued)

FOREIGN PATENT DOCUMENTS

| CN | 109684105 A | 4/2019 |
| CN | 111049670 A | 4/2020 |

(Continued)

OTHER PUBLICATIONS

First Office Action for Chinese Application No. 202110245817.5, dated Jun. 2, 2023, 20 pages.

(Continued)

*Primary Examiner* — Schquita D Goodwin
(74) *Attorney, Agent, or Firm* — KDW Firm PLLC

(57) ABSTRACT

Provided are a fusing and degradation method and apparatus for a micro-service, a device, a medium, and a program product, which relate to the field of the Internet, in particular to the field of fusing and degradation. The specific implementation is as follows: instantiating, by a monitoring probe woven into a micro-service traffic process, a fuse component according to an obtained fusing and degradation rule, and weaving, by the monitoring probe, the fuse component into the traffic process, where the fuse component is used for performing fusing and degradation on a traffic request processed in the traffic process. The fusing and degradation technology during the running of a micro-service is achieved through a probe so that the micro-service developer can fuse and degrade a micro-service application that is running without hard coding, thereby improving the efficiency and stability of the micro-service fusing and degradation.

13 Claims, 5 Drawing Sheets

---

S101

A monitoring probe woven into a micro-service traffic process instantiates a fuse component according to an obtained fusing and degradation rule

S102

The monitoring probe weaves the fuse component into the traffic process, where the fuse component is used for performing fusing and degradation on a traffic request processed in the traffic process

(51) Int. Cl.
*H04L 41/16* (2022.01)
*H04L 43/12* (2022.01)
*H04L 67/51* (2022.01)

(58) Field of Classification Search
CPC ..... H04L 43/10; H04L 43/16; H04L 41/0806; G06F 11/076; G06F 11/0793; G06F 11/0709; G06F 11/0751
See application file for complete search history.

(56) References Cited

U.S. PATENT DOCUMENTS

| | | | | |
|---|---|---|---|---|
| 2018/0083839 | A1* | 3/2018 | Fawcett | H04L 69/16 |
| 2018/0288129 | A1* | 10/2018 | Joshi | H04L 43/20 |
| 2020/0053834 | A1* | 2/2020 | Dahan | H04L 41/0816 |
| 2020/0117482 | A1* | 4/2020 | Lopata | G06F 9/44521 |
| 2021/0026786 | A1* | 1/2021 | Meier | G11C 11/1695 |
| 2021/0037114 | A1* | 2/2021 | Nikain | H04L 67/34 |
| 2022/0147409 | A1* | 5/2022 | Linck | G06F 18/217 |
| 2022/0231923 | A1* | 7/2022 | Di Martino | H04L 41/5041 |

FOREIGN PATENT DOCUMENTS

| | | |
|---|---|---|
| CN | 111130939 A | 5/2020 |
| CN | 111782340 A | 10/2020 |
| CN | 111831504 A | 10/2020 |
| CN | 112131036 A | 12/2020 |

OTHER PUBLICATIONS

First Search Report for Chinese Application No. 202110245817.5, dated Jun. 2, 2023, 7 pages.
Author Unknown., "Computer java programming, the most comprehensive! A text that makes you understand non-invasive principle of microservice probe". Dec. 29, 2020—URL: https://baijiahao.baidu.com/s?id=1687335419204822793&wfr—spider&for=pc.
Author Unknown., "Analysis on the realization principle of fault location system for classroom education and micro-service". May 15, 2020—URL: https://zhuanlan.zhihu.com/p/139867375?From_voters_page=true.

* cited by examiner

FUSING AND DEGRADATION METHOD AND APPARATUS FOR MICRO-SERVICE, DEVICE, AND MEDIUM

CROSS-REFERENCE TO RELATED APPLICATION

This application claims the priority to Chinese Patent Application No. CN202110245817.5, filed on Mar. 5, 2021 and entitled "FUSING AND DEGRADATION METHOD AND APPARATUS FOR MICRO-SERVICE, DEVICE, AND MEDIUM", the disclosure of which is incorporated herein by reference in its entirety.

TECHNICAL FIELD

The present application relates to the field of the Internet, in particular, to a fusing and degradation technology, and specifically, to a fusing and degradation method and apparatus for a micro-service, a device, a medium, and a program product.

BACKGROUND

Distributed micro-service architecture is the mainstream back-end service architecture of large Internet companies. The main characteristics of the micro-service architecture are many services and complex dependencies, and local failures may affect the stability of the entire system.

Therefore, performing fusing and degradation on external resources whose depend services are unstable is an important measure to ensure the high availability of Internet micro-service applications.

SUMMARY

The present application provides a fusing and degradation method and apparatus for a micro-service, a device, a medium, and a program product, to improve the efficiency and stability of micro-service fusing and degradation.

In a first aspect, the present application provides a fusing and degradation method for a micro-service, and the method includes the steps described below.

A monitoring probe woven into a micro-service traffic process instantiates a fuse component according to an obtained fusing and degradation rule.

The monitoring probe weaves the fuse component into the traffic process, where the fuse component is used for performing fusing and degradation on a traffic request processed in the micro-service traffic process.

In a second aspect, the present application further provides a fusing and degradation apparatus for a micro-service. The apparatus includes a monitoring probe woven into a micro-service traffic process. The monitoring probe includes a processor and a memory for storing execution instructions that when executed by the processor cause the processor to perform steps in an instantiation module and a weaving module.

The instantiation module is configured to instantiate a fuse component according to an obtained fusing and degradation rule.

The weaving module is configured to weave the fuse component into the traffic process, where the fuse component is used for performing fusing and degradation on a traffic request processed in the traffic process.

In a fourth aspect, the present application further provides a non-transitory computer-readable storage medium having computer instructions stored thereon. The computer instructions are used for causing a computer to perform the fusing and degradation method for a micro-service according to any embodiment of the present application.

It is to be understood that the content described in this part is neither intended to identify key or important features of embodiments of the present application nor intended to limit the scope of the present application. Other features of the present application will be readily understood from the following description. Other effects of the optional manners described above are described below in conjunction with specific implementations.

BRIEF DESCRIPTION OF DRAWINGS

The drawings are intended to provide a better understanding of the solution of the present application and not to limit the present application. In the drawings.

DETAILED DESCRIPTION

Example embodiments of the present application, including details of embodiments of the present application, are described hereinafter in conjunction with the drawings to facilitate understanding. The example embodiments are merely illustrative. Therefore, it will be appreciated by those having ordinary skill in the art that various changes and modifications may be made to the embodiments described herein without departing from the scope and spirit of the present application. Similarly, description of well-known functions and constructions is omitted hereinafter for clarity and conciseness.

Figure 1:
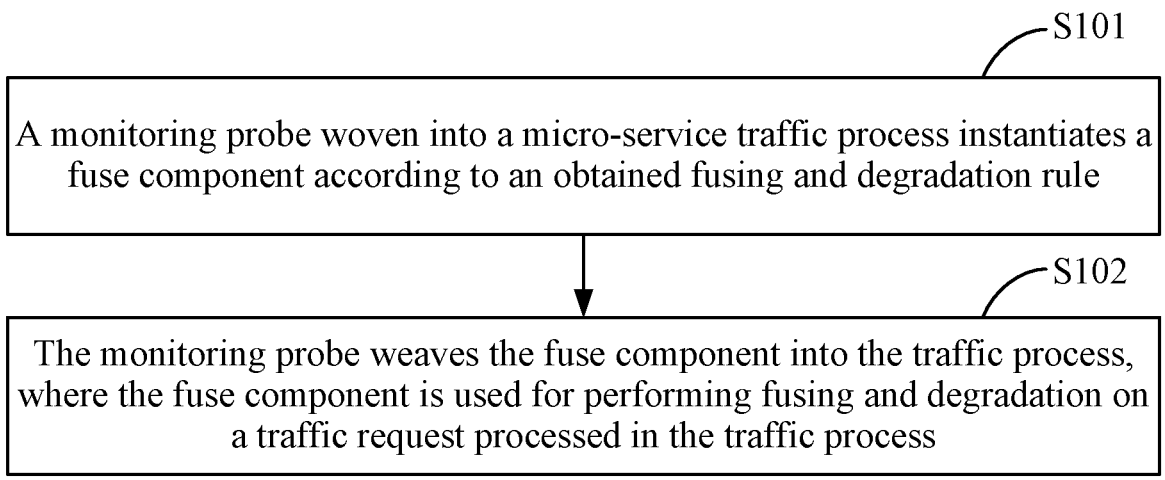
FIG. 1 is a flowchart of a fusing and degradation method for a micro-service according to an embodiment of the present application.

FIG. 1 is a flowchart of a fusing and degradation method for a micro-service according to an embodiment of the present application. This embodiment is applicable to a case of performing fusing and degradation on a request in a micro-service traffic process, and relates to the field of the Internet. The method can be performed by an fusing and degradation apparatus for a micro-service. The apparatus is implemented in software and/or hardware, and is preferably configured in an electronic device, such as a computer device or a server. As shown in FIG. 1, the method specifically includes the steps described below.

In S101, a monitoring probe woven into a micro-service traffic process instantiates a fuse component according to an obtained fusing and degradation rule.

The fuse component can be woven into the traffic process of a micro-service by a monitoring daemon component in a micro-service system by using the Java virtual machine technique, where the monitoring daemon component (hereinafter referred as to a monitoring daemon process) is an agent process of the same container where the traffic process in the micro-service system is located, and is responsible for monitoring the state of the traffic process and injecting a probe code. The fusing and degradation rule can be pulled from a database by the monitoring daemon component and written into a local disk of the micro-service system, where the database can be any database, and the fusing and degradation rule can be inputted by a user on a configuration center interface of the micro-service system and stored in the database for the monitoring daemon component to pull. Since the traffic process and the monitoring daemon process share the space of the local disk, the monitoring probe in the traffic process can also pull the fusing and degradation rule from the local disk, and thus the fusing and degradation rule is sent to the monitoring probe through the monitoring daemon component.

The monitoring probe carries a fuse SDK when woven into the traffic process, and the fuse SDK includes a component library for achieving the fusing and degradation function, so that the monitoring probe, after loaded by the traffic process, instantiates the fuse component through the fuse SDK according to the obtained fusing and degradation rule and fills each parameter value of the fuse component according to at least one threshold configured in the rule.

In S102, the monitoring probe weaves the fuse component into the traffic process, where the fuse component is used for performing fusing and degradation on a traffic request processed in the traffic process.

The monitoring probe, after instantiating the fuse component, weaves the fuse component into the traffic process so that the fuse component performs fusing and degradation on the traffic request processed in the traffic process.

Therefore, in this embodiment of the present application, the fuse component is woven into the traffic process through the probe to perform fusing and degradation on the request, and since there are many modules and many dependent services in the micro-service architecture and the traffic is complex, compared with the method of directly accessing the fuse component through the SDK or directly encoding a hard-coded degradation logic into the traffic code in the related art, in the present application, the traffic code does not need to be changed, and repetitive access is not needed either, thereby reducing the development and maintenance costs, gaining high stop loss efficiency, achieving the accurate degradation operation according to the obtained fusing and degradation rule, and ensuring high stability of the traffic.

In the technical solution of this embodiment of the present application, the fusing and degradation technology during the running of the micro-service is achieved through the probe so that the micro-service developer can fuse and degrade a micro-service application that is running without hard coding, thereby improving the efficiency and stability of the micro-service fusing and degradation, and such technology is very suitable for micro-service platforms with large traffic and large deployment scale, thereby greatly reducing access costs of the fusing and improving the stop loss efficiency of the fusing.

Figure 2:
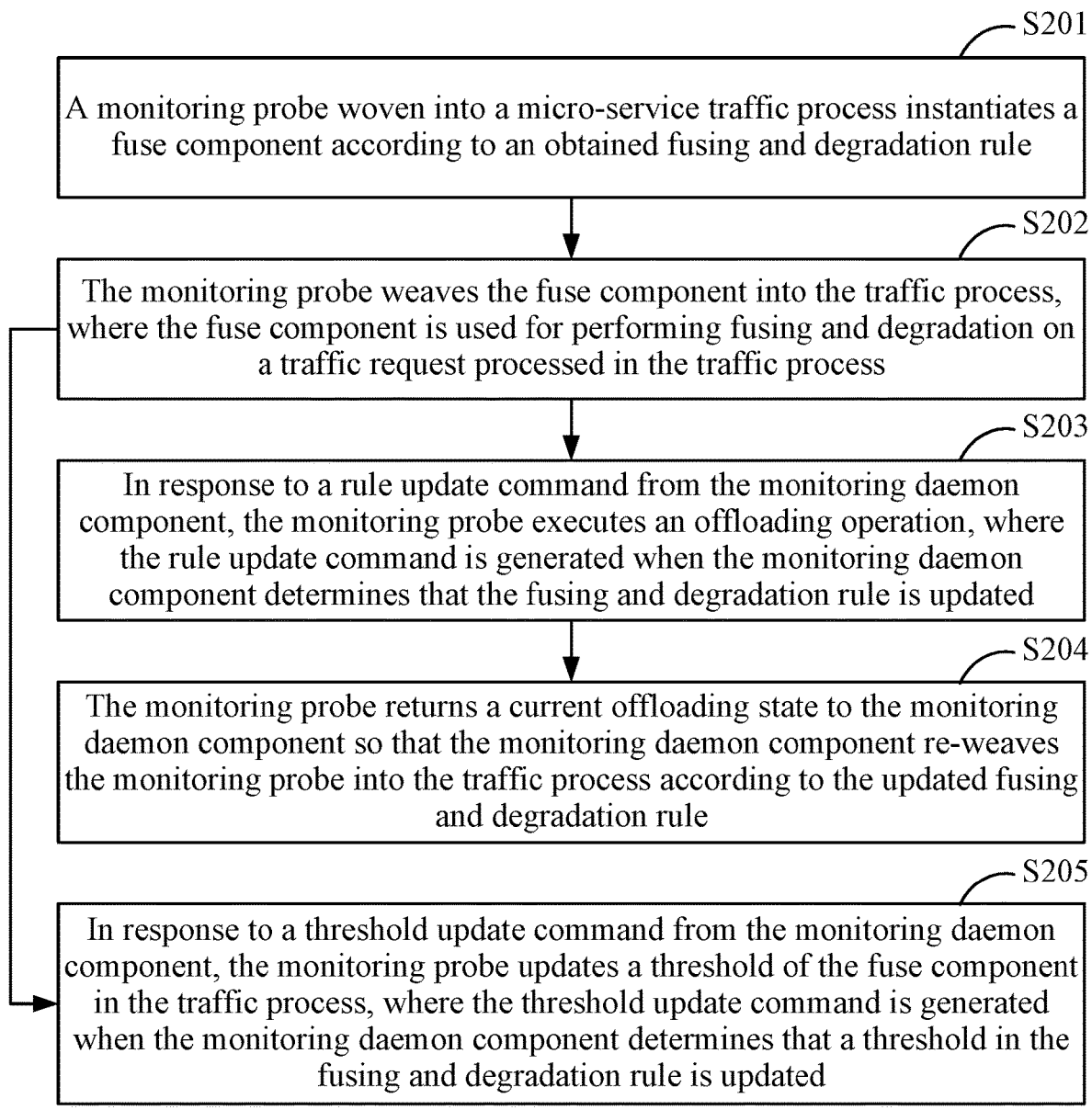
FIG. 2 is a flowchart of a fusing and degradation method for a micro-service according to an embodiment of the present application.

FIG. 2 is a flowchart of a fusing and degradation method for a micro-service according to an embodiment of the present application. This embodiment is further optimized on the basis of the preceding embodiment. As shown in FIG. 2, the method specifically includes the steps described below.

In S201, a monitoring probe woven into a micro-service traffic process instantiates a fuse component according to an obtained fusing and degradation rule.

In S202, the monitoring probe weaves the fuse component into the traffic process, where the fuse component is used for performing fusing and degradation on a traffic request processed in the traffic process.

In S203, in response to a rule update command from the monitoring daemon component, the monitoring probe executes an offloading operation, where the rule update command is generated when the monitoring daemon component determines that the fusing and degradation rule is updated.

In S204, the monitoring probe returns a current offloading state to the monitoring daemon component so that the monitoring daemon component re-weaves the monitoring probe into the traffic process according to the updated fusing and degradation rule.

The fusing and degradation rule in this embodiment of the present application is configurable and can achieve dynamic configuration, and the user can modify, delete or reset the fusing and degradation rule through the configuration center interface of the micro-service system as needs, thereby achieving non-intrusive, configurable and dynamic fusing and degradation.

Specifically, the monitoring daemon component in the micro-service system can monitor the fusing and degradation rule stored in the database and determines whether the fusing and degradation rule is updated. When the monitoring daemon component determines that the fusing and degradation rule is updated, the monitoring daemon component can generate a rule update command, write the rule update command into a specified file, and store the rule update command in the local disk. The monitoring probe polls the specified file of the local disk according to a preset period, obtains the rule update command, and executes the offloading operation. When the offloading is complete, the monitoring probe returns the current offloading state to the monitoring daemon component, the monitoring daemon component learns that the current monitoring probe has been offloaded according to the offloading state and then re-weaves a new monitoring probe into the traffic process according to the updated fusing and degradation rule. Meanwhile, the updated fusing and degradation rule is also written into the local disk so that the re-woven monitoring probe can obtain the updated fusing and degradation rule from the local disk.

Accordingly, if the user wants to delete the current fusing and degradation rule, the user can also perform configuration through the configuration center interface. At this point, the monitoring daemon component writes a deletion command rule into a designated file, and the current monitoring probe executes the offloading operation when obtaining the deletion command rule.

In S205, in response to a threshold update command from the monitoring daemon component, the monitoring probe updates a threshold of the fuse component in the traffic process, where the threshold update command is generated when the monitoring daemon component determines that a threshold in the fusing and degradation rule is updated.

The user can also change only one or more thresholds in the current fusing and degradation rule. At this point, if the monitoring daemon component monitors that a threshold in the fusing and degradation rule is updated, the monitoring daemon component generates a threshold update command and writes the threshold update command into a designated file of the local disk. After the current monitoring probe obtains the threshold update command, the monitoring probe can directly update the threshold of the current fuse component according to the new threshold in the traffic process.

In the technical solution of this embodiment of the present application, the fusing and degradation technology during the running of the micro-service is achieved through the probe so that the micro-service developer can achieve non-intrusive, configurable, and dynamic fusing and degradation without hard coding, thereby improving the efficiency and stability of the micro-service fusing and degradation and reducing the development and maintenance costs.

Figure 3A:
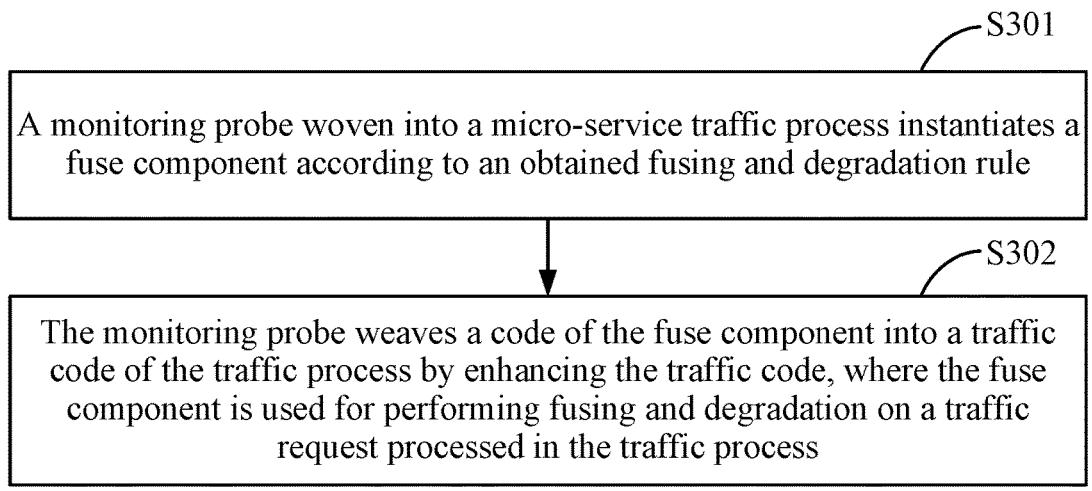
FIG. 3A is a flowchart of a fusing and degradation method for a micro-service according to an embodiment of the present application.

FIG. 3A is a flowchart of a fusing and degradation method for a micro-service according to an embodiment of the present application. This embodiment is further optimized on the basis of the preceding embodiments. As shown in FIG. 3A, the method specifically includes the steps described below.

In S301, a monitoring probe woven into a micro-service traffic process instantiates a fuse component according to an obtained fusing and degradation rule.

In S302, the monitoring probe weaves a code of the fuse component into a traffic code of the traffic process by enhancing the traffic code, where the fuse component is used for performing fusing and degradation on a traffic request processed in the traffic process.

Specifically, after the monitoring probe instantiates the fuse component, the monitoring probe starts to enhance the traffic code. The monitoring probe weaves related codes of the fuse component, including a first component code before traffic code execution and a second component code after traffic code execution, into the original traffic code by modifying a bytecode of the traffic code. Once the code of the fuse component is woven into the traffic code, traffic requests processed by the traffic code are counted by the fuse component, and traffic requests that need to be fused and degraded are processed.

The second component code after the traffic code execution is used for counting whether the traffic code execution succeeds to obtain a counting result. The first component code before the traffic code execution is used for determining whether to perform fusing and degradation according to the counting result of whether the traffic code execution succeeds and the fusing and degradation rule, and executing fusing and degradation in response to determining to perform fusing and degradation.

Figure 3B:
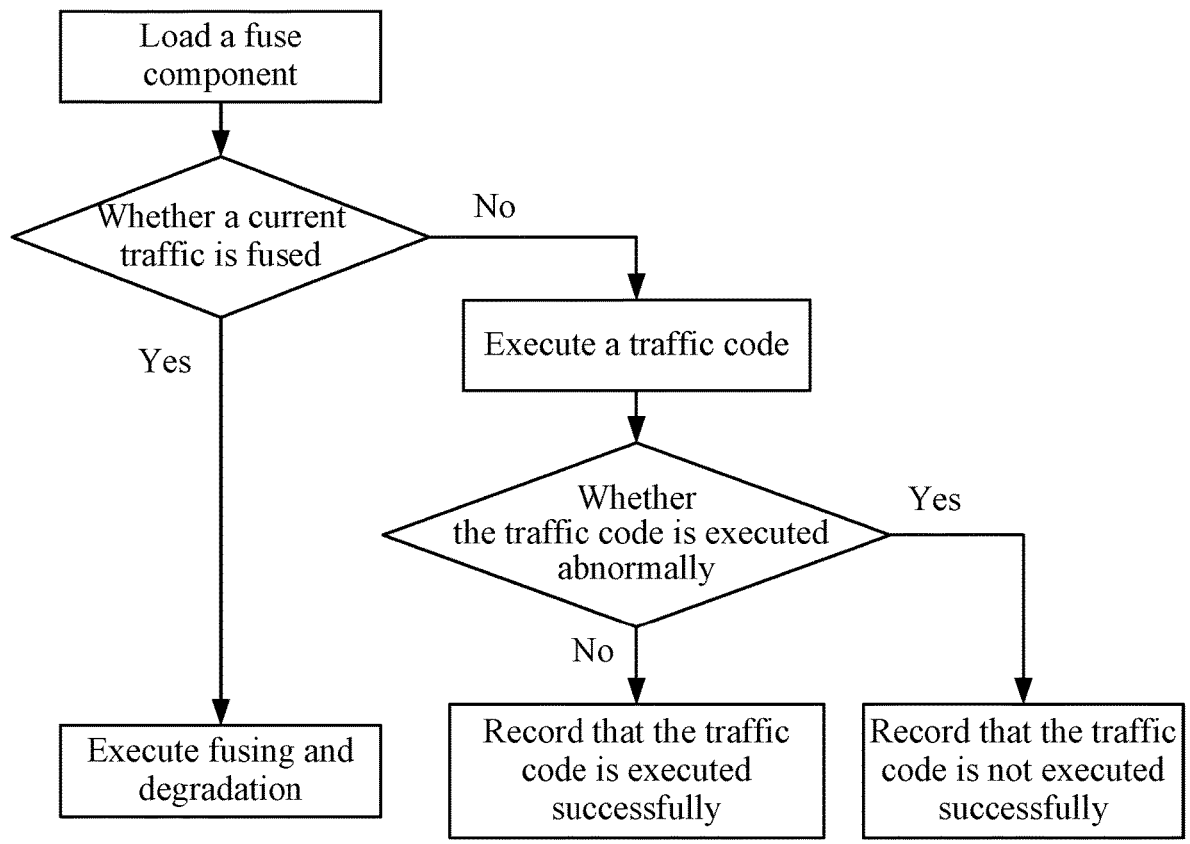
FIG. 3B is a functional flowchart of a fuse component in a fusing and degradation method according to an embodiment of the present application.

Specifically, as shown in FIG. 3B, the first component code before the traffic code execution determines whether the current traffic request needs to be fused and degraded; if it is determined that the current traffic request needs to be fused and degraded, the first component code performs fusing and degradation; and if it is determined that the current traffic request does not need to be fused and degraded, the first component code executes the traffic code. After the traffic code is executed, the second component code after the traffic code execution determines whether there is an abnormality in the traffic code execution and counts on the successful execution and the abnormal execution, respectively. The first component code before the traffic code execution determines whether to perform fusing and degradation according to the current state of the fuse component, and the current state of the fuse component is related to the execution of the traffic code.

Specifically, the fusing and degradation rule includes at least a degradation strategy, a fusing time-consuming threshold, and an error rate threshold of traffic execution. The degradation strategy can include, for example, performing degradation through a custom degradation function; or returning a null object; or constructing a new object to return by deserialization. Accordingly, the first component code before the traffic code execution is specifically used for performing the following operations.

In response to the current state of the fuse component being closed and an error rate of the traffic code execution exceeding the error rate threshold, the first component code performs degradation on a current traffic request according to the degradation strategy, and sets the current state of the fuse component as open.

In response to the current state of the fuse component being open and open time exceeding the fusing time-consuming threshold, the first component code sets the current state of the fuse component as half open.

In response to the current state of the fuse component being half open, the first component code randomly performs fusing and degradation on a set number of traffic requests in traffic requests.

In response to the current state of the fuse component being half open and an error rate of executing the set number of traffic requests exceeding the error rate threshold, the first component code sets the current state of the fuse component as open; and in response to the current state of the fuse component being half open and an error rate of executing the set number of traffic requests not exceeding the error rate threshold, the first component code sets the current state of the fuse component as closed.

Figure 3C:
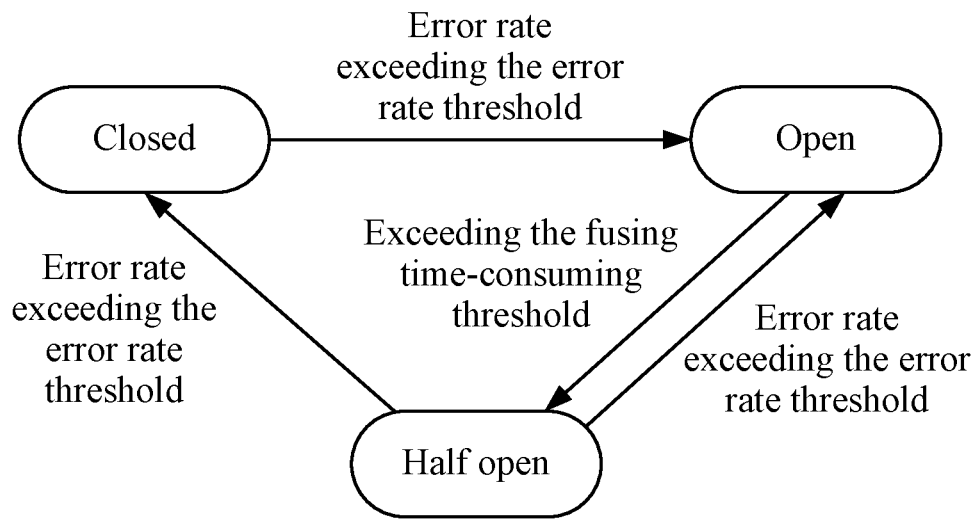
FIG. 3C is a schematic diagram of state transition of a fuse component according to an embodiment of the present application.

FIG. 3C is a schematic diagram of state transition of a fuse component according to an embodiment of the present application. Initially, the state of the fuse component can be closed. When the error rate of the traffic code execution exceeds the error rate threshold, it indicates that the traffic request needs to be fused and degraded to ensure the smooth operation of the entire micro-service. Therefore, the current traffic request is degraded according to the degradation strategy, and the current state of the fuse component is set as open. Since there are many reasons why the code execution fails and there is the possibility of service self-repair, the open time of the fuse component is detected through the fusing time-consuming threshold. If the open time exceeds the fusing time-consuming threshold, the state of the fuse component is set as half open, and fusing and degradation are only performed on a part of traffic requests, and the execution of this part of the traffic is continuously monitored. If the error rate of execution of this part of traffic requests exceeds the error rate threshold, the current state of the fuse component is set as open again; and if the error rate of execution of this part of traffic requests does not exceed the error rate threshold, the current state of the fuse component is set as closed.

Therefore, the execution of the traffic code is counted through the code of the fuse component woven into the traffic code, the current state of the fuse component is determined according to the counting result and the fusing and degradation rule, and fusing and degradation are performed on the traffic request which needs to be fused and degraded.

In the technical solution of the embodiment of the present application, the micro-service application that is running can be dynamically fused and degraded without hard coding, and the fusing and degradation rule can be dynamically adjusted, so that the access cost is low and the period is short. Moreover, the woven fuse component can count the access times of the traffic request and the failure times of traffic execution in the traffic code in real time and automatically trigger and change the current state of the fuse component, thereby achieving fusing and degradation and achieving the purpose of finely controlling the fusing effect without the intervention of the traffic party.

Figure 4:
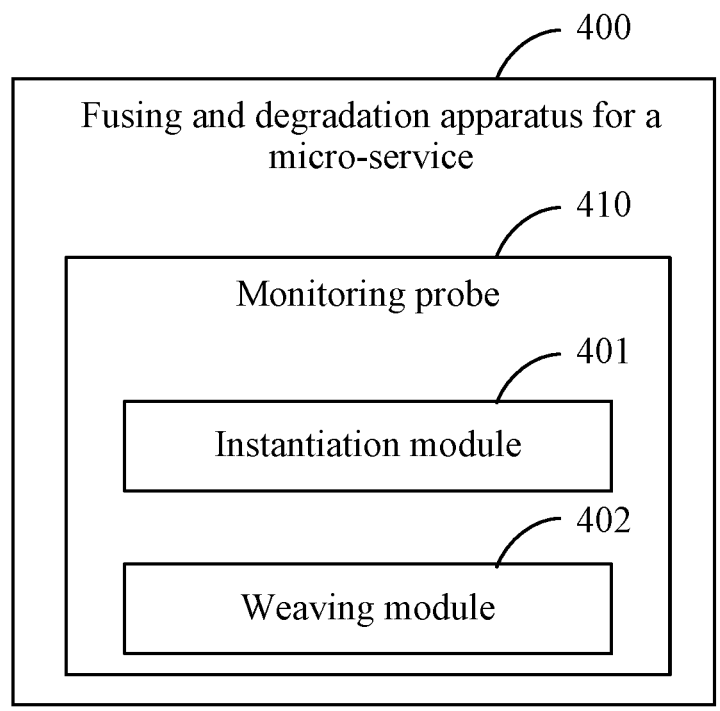
FIG. 4 is a structural diagram of a fusing and degradation apparatus for a micro-service according to an embodiment of the present application.

FIG. 4 is a structural diagram of a fusing and degradation apparatus for a micro-service according to an embodiment of the present application. This embodiment is applicable to a case of performing fusing and degradation on a request in a micro-service traffic process, and relates to the field of the Internet. The apparatus can implement the fusing and degradation method for a micro-service described in any embodiment of the present application. As shown in FIG. 4, the apparatus 400 includes a monitoring probe 410 woven into a micro-service traffic process. The monitoring probe 410 includes an instantiation module 401 and a weaving module 402.

The instantiation module 401 is configured to instantiate a fuse component according to an obtained fusing and degradation rule.

The weaving module 402 is configured to weave the fuse component into the traffic process, where the fuse component is used for performing fusing and degradation on a traffic request processed in the traffic process.

Optionally, the monitoring probe is woven into the traffic process by a monitoring daemon component in a micro-service system.

Optionally, the fusing and degradation rule is inputted by a user on a configuration center interface of the micro-service system and stored in a database, pulled from the database by the monitoring daemon component and written into a local disk of the micro-service system, and obtained from the local disk by the monitoring probe.

Optionally, the monitoring probe further includes a rule update command response module and an offloading state return module.

The rule update command response module is configured to, in response to a rule update command from the monitoring daemon component, execute an offloading operation, where the rule update command is generated when the monitoring daemon component determines that the fusing and degradation rule is updated.

The offloading state return module is configured to return a current offloading state to the monitoring daemon component so that the monitoring daemon component re-weaves the monitoring probe into the traffic process according to the updated fusing and degradation rule.

Optionally, the monitoring probe further includes a threshold update command response module.

The threshold update command response module is configured to, in response to a threshold update command from the monitoring daemon component, update a threshold of the fuse component in the traffic process, where the threshold update command is generated when the monitoring daemon component determines that a threshold in the fusing and degradation rule is updated.

Optionally, the weaving module is specifically configured to perform the following operation.

The monitoring probe weaves a code of the fuse component into a traffic code of the traffic process by enhancing the traffic code.

Optionally, the code of the fuse component includes a first component code before traffic code execution and a second component code after the traffic code execution.

The second component code after the traffic code execution is used for counting whether the traffic code execution succeeds to obtain a counting result.

The first component code before the traffic code execution is used for determining whether to perform fusing and degradation according to the counting result of whether the traffic code execution succeeds and the fusing and degradation rule, and executing fusing and degradation in response to determining to perform fusing and degradation.

Optionally, the fusing and degradation rule includes at least a degradation strategy, a fusing time-consuming threshold, and an error rate threshold of traffic execution.

Accordingly, the first component code before the traffic code execution is specifically used for performing the following operations.

In response to a current state of the fuse component being closed and an error rate of the traffic code execution exceeding the error rate threshold, degradation is performed on a current traffic request according to the degradation strategy, and the current state of the fuse component is set as open.

In response to the current state of the fuse component being open and open time exceeding the fusing time-consuming threshold, the current state of the fuse component is set as half open.

In response to the current state of the fuse component being half open, fusing and degradation are randomly performed on a set number of traffic requests in traffic requests.

In response to the current state of the fuse component being half open and an error rate of executing the set number of traffic requests exceeding the error rate threshold, the current state of the fuse component is set as open; and in response to the current state of the fuse component being half open and an error rate of executing the set number of traffic requests not exceeding the error rate threshold, the current state of the fuse component is set as closed.

Optionally, the degradation strategy includes: performing degradation through a custom degradation function; or returning a null object; or constructing a new object to return by deserialization.

The fusing and degradation apparatus for a micro-service provided in the embodiment of the present application can execute the fusing and degradation method for a micro-service provided in any embodiment of the present application, and has functional modules and beneficial effects corresponding to the performed method. For content not described in detail in this embodiment, reference may be made to the description of any method embodiment of the present application.

According to an embodiment of the present application, the present application further provides an electronic device, a readable storage medium, and a computer program product.

Figure 5:
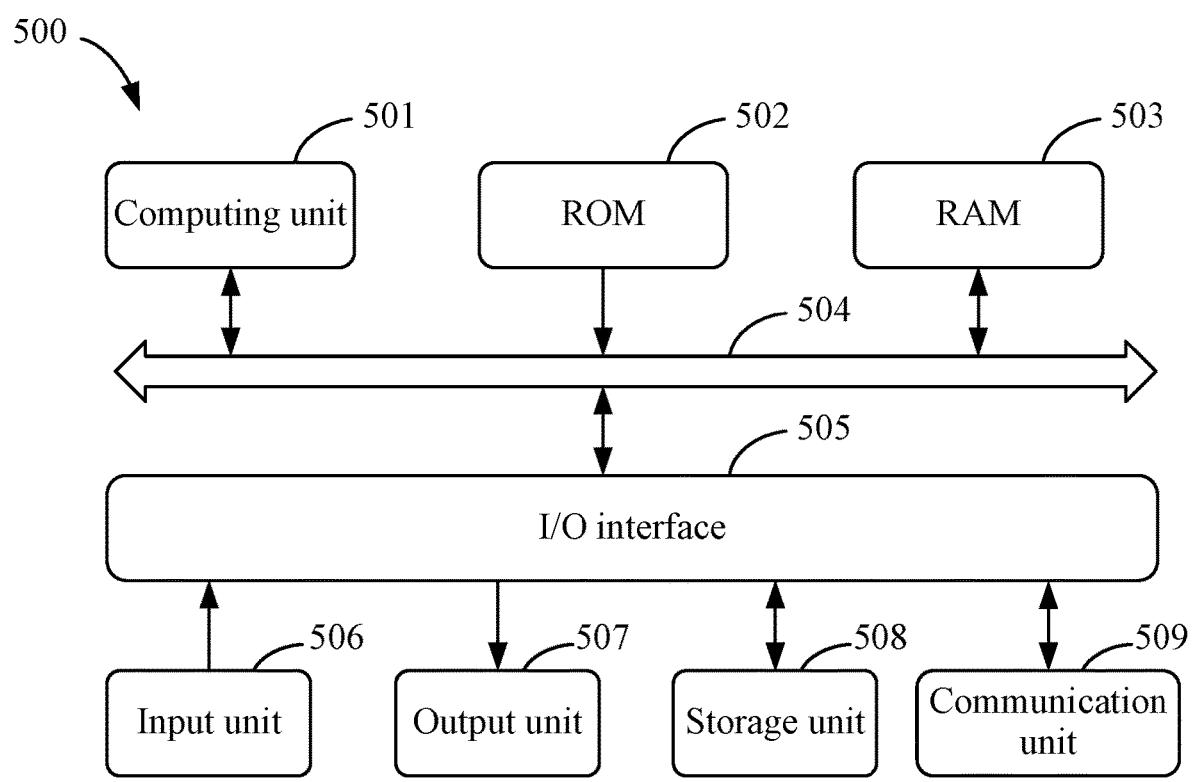
FIG. 5 is a block diagram of an electronic device for implementing a fusing and degradation apparatus for a micro-service according to an embodiment of the present application.

FIG. 5 illustrates a block diagram of an example electronic device 500 that can implement the embodiments of the present application. The electronic device is intended to represent various forms of digital computer, for example, a laptop computer, a desktop computer, a worktable, a personal digital assistant, a server, a blade server, a mainframe computer or another applicable computer. The electronic device may also represent various forms of mobile device, for example, a personal digital assistant, a cellphone, a smartphone, a wearable device or another similar computing device. Herein the shown components, the connections and relationships between these components, and the functions of these components are illustrative only and are not intended to limit the implementation of the present disclosure as described and/or claimed herein.

As shown in FIG. 5, the device 500 includes a computing unit 501. The computing unit 501 may perform various types of appropriate operations and processing based on a computer program stored in a read-only memory (ROM) 502 or a computer program loaded from a storage unit 508 to a random-access memory (RAM) 503. Various programs and data required for operations of the device 500 may also be stored in the RAM 503. The computing unit 501, the ROM 502, and the RAM 503 are connected to each other through a bus 504. An input/output (I/O) interface 505 is also connected to the bus 504.

Multiple components in the device 500 are connected to the I/O interface 505. The multiple components include an input unit 506 such as a keyboard and a mouse, an output unit 507 such as various types of displays and speakers, the storage unit 508 such as a magnetic disk and an optical disk, and a communication unit 509 such as a network card, a modem and a wireless communication transceiver. The communication unit 509 allows the device 500 to exchange information/data with other devices over a computer network such as the Internet and/or various telecommunications networks.

The computing unit 501 may be various general-purpose and/or special-purpose processing components having processing and computing capabilities. Some examples of the computing unit 501 include, but are not limited to, central processing units (CPUs), graphics processing units (GPUs), various dedicated artificial intelligence (AI) computing chips, various computing units running machine learning models and algorithms, digital signal processors (DSPs) and any suitable processors, controllers, and microcontrollers. The computing unit 501 executes various methods and processing described above, such as the fusing and degradation method for a micro-service. For example, in some embodiments, the fusing and degradation method for a micro-service may be implemented as a computer software program tangibly contained in a machine-readable medium such as the storage unit 508. In some embodiments, part or all of a computer program may be loaded and/or installed on the device 500 via the ROM 502 and/or the communication unit 509. When the computer program is loaded to the RAM 503 and executed by the computing unit 501, one or more steps of the fusing and degradation method for a micro-service described above may be executed. Alternatively, in other embodiments, the computing unit 501 may be configured, in any other suitable manner (for example, by means of firmware), to execute the fusing and degradation method for a micro-service.

Herein various embodiments of the systems and techniques described above may be implemented in digital electronic circuitry, integrated circuitry, field-programmable gate arrays (FPGAs), application-specific integrated circuits (ASICs), application-specific standard products (ASSPs), systems on chips (SoCs), complex programmable logic devices (CPLDs), computer hardware, firmware, software, and/or combinations thereof. The various embodiments may include implementations in one or more computer programs. The one or more computer programs are executable and/or interpretable on a programmable system including at least one programmable processor. The programmable processor may be a dedicated or general-purpose programmable processor for receiving data and instructions from a memory system, at least one input device and at least one output device and transmitting the data and instructions to the memory system, the at least one input device, and the at least one output device.

Program codes for implementing the methods of the present disclosure may be compiled in any combination of one or more programming languages. These program codes may be provided for a processor or controller of a general-purpose computer, a special-purpose computer or another programmable data processing device such that the program codes, when executed by the processor or controller, cause functions/operations specified in the flowcharts and/or block diagrams to be implemented. The program codes may be executed in whole on a machine, executed in part on a machine, executed, as a stand-alone software package, in part on a machine and in part on a remote machine, or executed in whole on a remote machine or a server.

In the context of the present disclosure, the machine-readable medium may be a tangible medium that may include or store a program that is used by or used in conjunction with a system, apparatus or device that executes instructions. The machine-readable medium can be a machine-readable signal medium or a machine-readable storage medium. The machine-readable medium may include, but are not limited to, electronic, magnetic, optical, electromagnetic, infrared or semiconductor systems, apparatuses or devices or any suitable combinations thereof. More specific examples of the machine-readable storage medium may include an electrical connection based on one or more wires, a portable computer disk, a hard disk, a random-access memory (RAM), a read-only memory (ROM), an erasable programmable read-only memory (EPROM), a flash memory, an optical fiber, a portable compact disk read-only memory (CD-ROM), an optical memory device, a magnetic memory device or any suitable combination thereof.

In order that interaction with a user is provided, the systems and techniques described herein may be implemented on a computer. The computer has a display device (for example, a cathode-ray tube (CRT) or a liquid-crystal display (LCD) monitor) for displaying information to the user; and a keyboard and a pointing device (for example, a mouse or a trackball) through which the user can provide input for the computer. Other types of devices may also be used for providing interaction with a user. For example, feedback provided for the user can be sensory feedback in any form (for example, visual feedback, auditory feedback or haptic feedback). Moreover, input from the user can be received in any form (including acoustic input, voice input or haptic input).

The systems and techniques described herein may be implemented in a computing system including a back-end component (for example, a data server), a computing system including a middleware component (for example, an application server), a computing system including a front-end component (for example, a client computer having a graphical user interface or a web browser through which a user can interact with implementations of the systems and techniques described herein) or a computing system including any combination of such back-end, middleware or front-end components. Components of a system may be interconnected by any form or medium of digital data communication (for example, a communication network). Examples of the communication network include a local area network (LAN), a wide area network (WAN), a blockchain network, and the Internet.

The computing system can include clients and servers. A client and a server are generally remote from each other and typically interact through a communication network. The relationship between the client and the server arises by virtue of computer programs running on respective computers and having a client-server relationship to each other. The server may be a cloud server, also referred to as a cloud computing server or a cloud host, which is a host product in a cloud computing service system, so as to solve the defects of difficult management and weak traffic scalability in traditional physical hosts and VPS services. The server can also be a server of a distributed system or a server combined with blockchain.

It is to be understood that various forms of the preceding flows can be used, with steps reordered, added or removed. For example, the steps described in the present disclosure may be executed in parallel, in sequence or in a different order as long as the desired result of the technical solution disclosed in the present disclosure is achieved. The execution sequence of these steps is not limited herein.

The scope of the present disclosure is not limited to the preceding embodiments. It is to be understood by those skilled in the art that various modifications, combinations, subcombinations, and substitutions may be made depending on design requirements and other factors. Any modifications, equivalent substitutions, improvements and the like made within the spirit and principle of the present disclosure is within the scope of the present disclosure.

What is claimed is:

1. A fusing and degradation method for a micro-service, comprising:
    instantiating, by a monitoring probe woven into a micro-service traffic process, a fuse component according to an obtained fusing and degradation rule; and
    weaving, by the monitoring probe, a code of the fuse component into a traffic code of the micro-service traffic process, wherein the code of the fuse component is used for counting a traffic request processed in the micro-service traffic process and performing fusing and degradation on the traffic request according to a counting result and the fusing and degradation rule;
    wherein weaving, by the monitoring probe, the code of the fuse component into the traffic code of the micro-service traffic process comprises:
    weaving, by the monitoring probe, the code of the fuse component into the traffic code of the micro-service traffic process by enhancing the traffic code;
    wherein the code of the fuse component comprises a first component code before traffic code execution and a second component code after the traffic code execution;
    wherein the second component code is used for counting whether the traffic code execution succeeds to obtain the counting result; and
    the first component code is used for determining whether to perform fusing and degradation according to the counting result and the fusing and degradation rule, and executing fusing and degradation in response to determining to perform fusing and degradation; and
    wherein the fusing and degradation rule comprises at least a degradation strategy, a fusing time-consuming threshold, and an error rate threshold of traffic execution; and
    the first component code is used for:
    in response to a current state of the fuse component being closed and an error rate of the traffic code execution exceeding the error rate threshold, performing degradation on a current traffic request according to the degradation strategy, and setting the current state of the fuse component as open;
    in response to the current state of the fuse component being open and open time exceeding the fusing time-consuming threshold, setting the current state of the fuse component as half open;
    in response to the current state of the fuse component being half open, randomly performing fusing and degradation on a set number of traffic requests in traffic requests;
    in response to the current state of the fuse component being half open and an error rate of executing the set number of traffic requests exceeding the error rate threshold, setting the current state of the fuse component as open; and
    in response to the current state of the fuse component being half open and an error rate of not executing the set number of traffic requests exceeding the error rate threshold, setting the current state of the fuse component as closed.

2. The method according to claim 1, wherein the monitoring probe is woven into the micro-service traffic process by a monitoring daemon component in a micro-service system.

3. The method according to claim 2, wherein the fusing and degradation rule is inputted by a user on a configuration center interface of the micro-service system and stored in a database, pulled from the database by the monitoring daemon component and written into a local disk of the micro-service system, and obtained from the local disk by the monitoring probe.

4. The method according to claim 2, further comprising:
    in response to a rule update command from the monitoring daemon component, executing, by the monitoring probe, an offloading operation, wherein the rule update command is generated when the monitoring daemon component determines that the fusing and degradation rule is updated; and
    returning, by the monitoring probe, a current offloading state to the monitoring daemon component so that the monitoring daemon component re-weaves a new monitoring probe into the micro-service traffic process according to the updated fusing and degradation rule.

5. The method according to claim 2, further comprising:
    in response to a threshold update command from the monitoring daemon component, updating, by the monitoring probe, a threshold of the fuse component in the micro-service traffic process, wherein the threshold update command is generated when the monitoring daemon component determines that a threshold in the fusing and degradation rule is updated.

6. The method according to 1, the degradation strategy comprises:
    performing degradation through a custom degradation function; or
    returning a null object; or
    constructing a new object to return by deserialization.

7. A non-transitory computer-readable storage medium having computer instructions stored thereon, wherein the computer instructions are used for causing a computer to perform the fusing and degradation method for a micro-service according to claim 1.

8. A fusing and degradation apparatus for a micro-service, comprising a monitoring probe woven into a micro-service traffic process, wherein the monitoring probe comprises a processor and a memory for storing execution instructions that when executed by the processor cause the processor to perform steps in the following modules:

an instantiation module, which is configured to instantiate a fuse component according to an obtained fusing and degradation rule; and
a weaving module, which is configured to weave a code of the fuse component into a traffic code of the micro-service traffic process, wherein the fuse component is used for counting a traffic request processed in the micro-service traffic process and performing fusing and degradation on the traffic request according to a counting result and the fusing and degradation rule;
wherein the weaving module is specifically configured to:
weave, by the monitoring probe, the code of the fuse component into the traffic code of the micro-service traffic process by enhancing the traffic code;
wherein the code of the fuse component comprises a first component code before traffic code execution and a second component code after the traffic code execution;
wherein the second component code is used for counting whether the traffic code execution succeeds to obtain the counting result and the first component code is used for determining whether to perform fusing and degradation according to the counting result and the fusing and degradation rule, and executing fusing and degradation in response to determining to perform fusing and degradation; and
wherein the fusing and degradation rule comprises at least a degradation strategy, a fusing time-consuming threshold, and an error rate threshold of traffic execution; and the first component code is used for:
in response to a current state of the fuse component being closed and an error rate of the traffic code execution exceeding the error rate threshold, performing degradation on a current traffic request according to the degradation strategy, and setting the current state of the fuse component as open;
in response to the current state of the fuse component being open and open time exceeding the fusing time-consuming threshold, setting the current state of the fuse component as half open;
in response to the current state of the fuse component being half open, randomly performing fusing and degradation on a set number of traffic requests in traffic requests;
in response to the current state of the fuse component being half open and an error rate of executing the set number of traffic requests exceeding the error rate threshold, setting the current state of the fuse component as open; and
in response to the current state of the fuse component being half open and an error rate of not executing the set number of traffic requests exceeding the error rate threshold, setting the current state of the fuse component as closed.

9. The apparatus according to claim 8, wherein the monitoring probe is woven into the micro-service traffic process by a monitoring daemon component in a micro-service system.

10. The apparatus according to claim 9, wherein the fusing and degradation rule is inputted by a user on a configuration center interface of the micro-service system and stored in a database, pulled from the database by the monitoring daemon component and written into a local disk of the micro-service system, and obtained from the local disk by the monitoring probe.

11. The apparatus according to claim 9, wherein the monitoring probe further comprises:
a rule update command response module, which is configured to, in response to a rule update command from the monitoring daemon component, execute an offloading operation, wherein the rule update command is generated when the monitoring daemon component determines that the fusing and degradation rule is updated; and
an offloading state return module, which is configured to return a current offloading state to the monitoring daemon component so that the monitoring daemon component re-weaves the monitoring probe into the micro-service traffic process according to the updated fusing and degradation rule.

12. The apparatus according to claim 9, wherein the monitoring probe further comprises:
a threshold update command response module, which is configured to, in response to a threshold update command from the monitoring daemon component, update a threshold of the fuse component in the micro-service traffic process, wherein the threshold update command is generated when the monitoring daemon component determines that a threshold in the fusing and degradation rule is updated.

13. The apparatus according to 8, the degradation strategy comprises:
performing degradation through a custom degradation function; or
returning a null object; or
constructing a new object to return by deserialization.

* * * * *